US007835294B2

(12) United States Patent
Shuster

(10) Patent No.: US 7,835,294 B2
(45) Date of Patent: Nov. 16, 2010

(54) MESSAGE FILTERING METHOD

(76) Inventor: Gary Stephen Shuster, 486 E. Rusty Harbor Dr., Fresno, CA (US) 93720

( * ) Notice: Subject to any disclaimer, the term of this patent is extended or adjusted under 35 U.S.C. 154(b) by 892 days.

(21) Appl. No.: 10/934,604

(22) Filed: Sep. 3, 2004

(65) Prior Publication Data

US 2005/0169274 A1 Aug. 4, 2005

Related U.S. Application Data

(60) Provisional application No. 60/499,825, filed on Sep. 3, 2003.

(51) Int. Cl.
*H04L 12/28* (2006.01)

(52) U.S. Cl. .................. 370/252; 370/395.52; 709/206; 709/207; 709/229

(58) Field of Classification Search ................. 709/153, 709/206, 229, 218, 245, 207; 713/168, 206, 713/207; 726/206, 4; 370/252, 395.52; 455/412.1, 455/412.2
See application file for complete search history.

(56) References Cited

U.S. PATENT DOCUMENTS 5,884,033 A * 3/1999 Duvall et al. ................ 709/206
5,999,932 A * 12/1999 Paul ............................ 707/10
6,421,709 B1 * 7/2002 McCormick et al. ........ 709/206
6,460,050 B1 * 10/2002 Pace et al. ............... 707/104.1
7,072,944 B2 * 7/2006 Lalonde et al. ............. 709/206
7,117,358 B2 * 10/2006 Bandini et al. .............. 713/153
7,320,021 B2 * 1/2008 Lalonde et al. ............. 709/206
7,451,233 B2 * 11/2008 Parekh et al. ............... 709/245
2002/0072984 A1 * 6/2002 Rothman et al. .............. 705/26
2003/0187949 A1 * 10/2003 Bhatt et al. ................. 709/218
2004/0181571 A1 * 9/2004 Atkinson et al. ............ 709/200
2004/0260776 A1 * 12/2004 Starbuck et al. ............. 709/206
2004/0267886 A1 * 12/2004 Malik ......................... 709/206
2005/0022008 A1 * 1/2005 Goodman et al. ........... 713/201
2006/0224752 A1 * 10/2006 Parekh ....................... 709/230

* cited by examiner

*Primary Examiner*—William Trost, IV
*Assistant Examiner*—Emmanuel Maglo
(74) *Attorney, Agent, or Firm*—Knobbe Martens Olson & Bear LLP

(57) ABSTRACT

A message filtering method makes use of a database in which domain names of a network, such as the Internet, are associated with IP addresses, or with geographic locations. Electronic messages are tested for authenticity by comparing domain names and IP addresses for a message being tested with information in the database. If the sender information in the message does not have the same associations as information in the database, the message may be blocked, flagged as spam, or subjected to further filtering.

19 Claims, 1 Drawing Sheet

100
READ SENDER INFORMATON 102
TRUSTED SENDER? 104
YES
PASS 112a
NO
GEOGRAPHY MATCH? 106
NO
FAIL 112b
YES
IP ADDRESS MATCH 108
NO
YES
PASS 112a
110

100
102
READ SENDER INFORMATON
104
TRUSTED SENDER?
YES
PASS
112a
NO
106
GEOGRAPHY MATCH?
NO
110
FAIL
112b
YES
108
IP ADDRESS MATCH
NO
YES
PASS
112a

MESSAGE FILTERING METHOD

CROSS-REFERENCE TO RELATED APPLICATION

This application claims priority pursuant to 35 U.S.C. §119 (e) to U.S. Provisional Application No. 60/499,825, filed Sep. 3, 2003, which application is specifically incorporated herein, in its entirety, by reference.

BACKGROUND OF THE INVENTION

1. Field of the Invention

The present invention relates to methods and systems for filtering electronic messages, such as used to detect "spam" messages delivered to an electronic address.

2. Description of Related Art

Unsolicited commercial email, sometimes called "spam," is a persistent problem for operators and users of email systems. Despite the introduction of various message-filtering technologies, a substantial amount of spam continues to be generated and delivered to many users. Spam filters often employ very sophisticated algorithms for application to message content to determine whether a particular message should be classified as spam. Almost as quickly as these filters evolve and learn, spam generators develop new messages that can pass through existing spam filters. At the same time, legitimate email is sometimes incorrectly classified as spam by message filters, which may lead to damaging communications failures.

There is also the problem of distinguishing between legitimate, appropriate commercial solicitations, and illegitimate spam. Legitimate commercial offers are not unwelcome for most users, and may be part of systems for financing content and network resources providers. Such messages are not indiscriminately generated and do not create undue burdens for email users and systems. Illegitimate spam, in contrast, tends to be generated indiscriminately and is virtually always unwanted by the recipient.

It is desirable, therefore, to provide an improved message filtering method that overcomes the limitations of the prior art. The method should be capable of integrated application with existing filtering methods, or as a stand-alone application.

SUMMARY OF THE INVENTION

The present invention provides another method for enhancing message filtering, which should improve accurate identification of spam messages on wide-area computer networks, such as the Internet. The method operates by extracting a purported message sender from the message header information. In particular, the sender's domain name is extracted and compared to a database of known IP addresses. The database may be configured to provide several information for several different authentication layers. Information for a first layer may comprise a database containing names of geographic locations, for example countries, associated with known IP addresses and domain names. Information for a second layer may comprise a database of IP addresses for domain names. Information for a third layer may comprise IP addresses for trusted message senders.

In an embodiment of the invention, an extracted IP address of the purported message sender may be compared to the IP addresses for trusted message senders from the database. If the message sender is not recognized as trusted, the message may be blocked, flagged as spam, or subjected to further filtering.

In addition, or in the alternative, an extracted IP address and domain name of the purported sender may be checked against the database of locations to determine whether the IP address and domain name of the sender are associated with the same geographic location. For example, a message may indicate a sender domain ending in ".co.uk.," which is associated with the United Kingdom in the geography database. If the message sender IP address is not associated with the same location—i.e., the United Kingdom in this example—then the message may be blocked, flagged as spam, or subjected to further filtering.

In yet another embodiment, which may be applied in the alternative or in addition to the methods described above, an extracted IP address and domain name of the purported sender may be checked against the database of IP addresses and associated domain names. If the message sender IP address is not one of the IP addresses associated with the sender domain name, then the message may be blocked, flagged as spam, or subjected to further filtering. For example, a message with a sender domain of "web1000.com" should originate from an IP address in the range of 66.28.153.1.to 66.28.153.255, provided that is the range associated with the web1000 domain in the database.

Information for the database for use in the method may be obtained or maintained in various different ways, which may be applied separately, or in combination. For example: (a) IP addresses associated with web pages associated with a domain may be looked up; (b) IP addresses associated with MX records for the domains may be looked up; (c) the owner of a domain name may be identified, and a block of IP addresses associated with the owner may be looked up; (d) a database of "whitelisted" IP's associated with specified mail records may be created; (e) a database of self-entered IP addresses associated with domains may be created, optionally requiring the self-entry to be made from the IP address sought to be added or with a delay prior to whitelisting; and (f) a whitelist of domain-IP address combinations may be created using the method disclosed in U.S. Pat. No. 6,199,102.

A more complete understanding of the message filtering method will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

Figure 1:
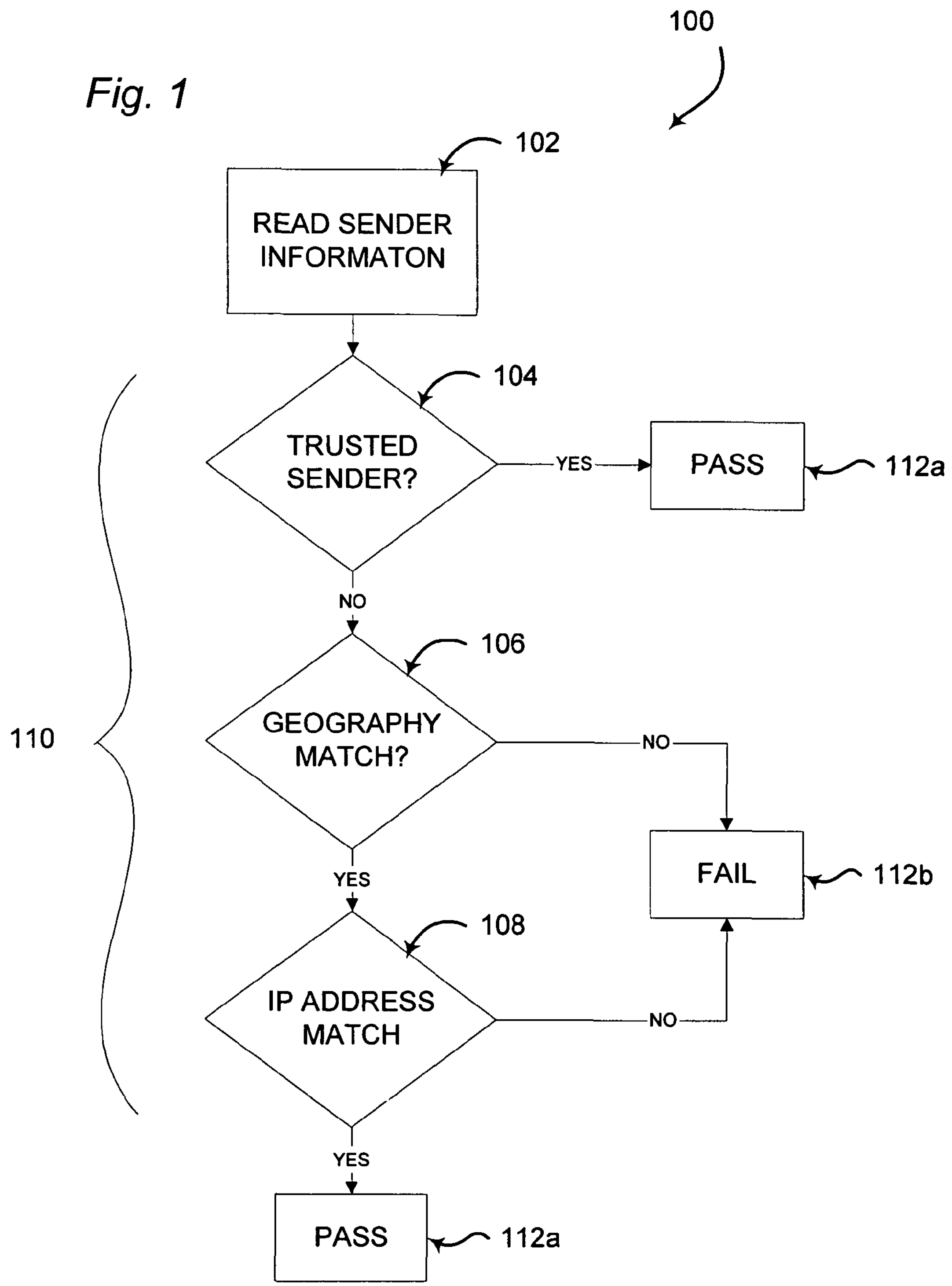
FIG. 1 is a flow diagram showing exemplary steps of a method for filtering an electronic message according to the invention.

The present invention provides a method for filtering electronic messages that overcomes the limitations of the prior art. It should be appreciated that "filtering" as used herein is not limited to blocking the transmission of an electronic message, but may also encompass other outputs such as flagging as message or placing it in a separate storage location, while still leaving it accessible to the intended recipient.

FIG. 1 shows exemplary steps of a method 100 for filtering electronic messages. Method 100 may be implemented on electronic messaging systems in use on wide-area networks, such as the Internet. Implementation of electronic messaging, e.g., email, using the Internet is well understood in the art, and need not be generally described here.

Certain details concerning the Internet, however, may be helpful for understanding an exemplary embodiment of of the invention. Internet email messages are provided with header information that identifies a domain for the sender of the message and an IP (Internet Protocol) address for the server originating the message. While it is relatively easy to supply a message header with a false domain name for the sender, supplying a false IP address for the originating server is more difficult. The invention may be configured to take advantage of these aspects of Internet email messaging.

The method may be implemented on any suitable system that receives email messages. For example, the method may be implemented at a "post office" mail server, or at an end-user computer. Details of such systems are well known in the art. A computer for receiving email generally comprises the essential elements of a connection to the wide area network, a memory holding instructions (e.g., operating system and application software) and data, a display or other user interface, a user input device such as a keyboard or mouse, and a processing unit for executing the system and application software. The memory may also include a database of information for use in the method of the invention. In addition, or in the alternative, the database may be accessed through a network connection. Computers for receiving email may include application software in the memory, which is configured to receive (in either "push" or "pull" mode) email messages. The messages may be either addressed directly to the computer in the case of a mail server having an Internet address, or addressed to an end user of a local network, such as the mail service of an Internet service provider. End-user computers may be instructed to periodically connect to the applicable mail server to download or remotely view the messages collected there. In view of the foregoing, one of ordinary skill will readily appreciate the context in which the method may be performed, and various alternatives for implementing the method in software at the mail server, end-user computer, or both.

Referring again to FIG. 1, at step 102 Internet message headers for email messages are parsed, and sender information contained therein is read. In particular, the sender information includes the domain and IP address of the originating sender. Sender information may also include other information from the header, which according to the method of the invention may be used to confirm the authenticity of the originating domain and IP address. After being read, the sender information is retained in memory for use in subsequent filtering steps 110 of method 100.

Step 102 may be carried out in various different ways. For example, application software for receiving email messages may include a module that parses Internet message headers and reads sender information contained therein, either at the mail server or end user level. Such software may operated every time a message is received. In the alternative, an "inbox" of stored messages may periodically be scanned using any suitable software to extract and read the header information. Subsequently, email mail be flagged or moved into directories for subsequent handling by email viewing software.

Comparison or testing steps 110 may then be performed to determine whether the message is likely to be undesirable spam. Steps 110 should be regarded as essentially independent and capable of being performed in any desired order, with the order diagrammed in FIG. 1 merely being exemplary. Also, it is not necessary to perform every one of steps 110; any combination of the particular steps 104, 106 and 108 making up steps 110 may be selected.

The object of comparison steps 110 is to determine whether an email message is likely to be undesirable spam; i.e., reaching a conclusion of "pass" 112*a* or "fail" 112*b*. Steps 112*a-b*, in turn, may be regarded as representing the essential act of filtering—providing a pass/fail conclusion. Thereafter, one of ordinary skill may make any desired use of the provided conclusion. For example, failing messages may be destroyed, placed in a special directory, or subjected to further testing. Likewise, passing messages may be transmitted to the addressee, placed in a special directory, or subjected to further testing. Method 100 merely provides information about the likelihood that a message is spam, and is not intended to be limited to any particular action taken with a filtered message.

At step 104, the sender information may be compared with a database of Internet address information to determine whether the message was sent from a trusted sender. A trusted sender may be identified by matching the message sender's domain and IP address to an entry in a list of trusted sender domain and IP addresses in the database. If a match to a trusted sender is found, the message may be filtered at step 112*a* by flagging or otherwise handling as a non-spam message, or in the alternative, subjected to further testing. If no match is found, the message may be subjected to further testing at steps 106, 108 or as otherwise desired, or filtered at step 112*b* as a failed (spam) message.

The database of trusted senders may comprise a previously existing list that is maintained to periodically add and delete domains and IP addresses of trusted senders. Any desired criteria may be used to select trusted senders for addition to such a database. Optionally, an automatic or semi-automatic method may be used to build and maintain such a database. For example, (a) a database of "whitelisted" IP's associated with specified mail records may be created; (b) a database of self-entered IP addresses associated with domains may be created, optionally requiring the self-entry to be made from the IP address sought to be added or with a delay prior to whitelisting; and (c) a whitelist of domain-IP address combinations may be created using the method disclosed in U.S. Pat. No. 6,199,102.

At step 106, sender information may be compared with the database of Internet address information to determine a geographic location of the purported sender, and compare against a geographic location for the originating IP address. If the geographic locations do not match, the message may be subjected to further testing at step 108 or as otherwise desired, or filtered at step 112*b* as a failed (spam) message. If the geographic locations match, the message may be filtered at step 112*a* by flagging or otherwise handling as a non-spam message, or in the alternative, subjected to further testing. For example, if the domain name indicates a message originated from the United States, but the originating IP address belongs to a server (as determined from the database of Internet information) in China, this may be taken as an indication that the message is spam.

Information concerning geographic location of domains and IP addresses may be added to the database using any suitable method or combination thereof. For example, (a) the domain name system for the Internet may be used to determine a geographic location for a domain; (b) IP addresses associated with web pages from a domain may be looked up; (c) IP addresses associated with MX records for the domains may be looked up; (d) the owner of a domain name may be identified, and a block of IP addresses associated with the owner may be looked up.

At step 108, sender information may be compared with the database of Internet address information to determine whether the IP address and domain of the sender are consistent with IP addresses for that domain as recorded in the database. For example, if the sender domain is web1000.com, the database may list IP addresses in the range of 66.28.153.1.to 66.28.153.255 for that domain. Any message originating from web1000.com but lacking an originating IP address in the indicated range may be subjected to further testing as otherwise desired, or filtered at step 112*b* as a failed (spam) message. On the other hand, if the originating IP address matches an IP address in the database for the originating domain, the message may be filtered at step 112*a* by flagging or otherwise handling as a non-spam message, or in the alternative, subjected to further testing.

As previously described, steps 112*a-b* may be regarded as representing the essential act of filtering: providing a pass/fail conclusion. The invention is not limited to any particular action taken with that conclusion. It is sufficient for filtering for a conclusion to be reached. "Pass/fail" is used in a general sense of any estimate for the probability that a particular message is spam or not. For example, providing a conclusion that a message is has a 60% probability (or any other probability) of being spam should be regarded as filtering within the scope of the invention, just as much as a simple pass/fail conclusion.

Having thus described a preferred embodiment of the message filtering system, it should be apparent to those skilled in the art that certain advantages of the within system have been achieved. It should also be appreciated that various modifications, adaptations, and alternative embodiments thereof may be made within the scope and spirit of the present invention. For example, and embodiment using an Internet protocol and domain name system has been illustrated, but it should be apparent that the inventive concepts described above would be equally applicable to similar protocols and naming systems for wide area networks. The invention is defined by the following claims.

What is claimed is:

1. A method comprising:

reading sender information for an electronic mail message, wherein the sender information comprises an originating domain name and an originating IP address for a server originating the electronic mail message;

determining a first geographic location associated with the originating domain name;

determining a second geographic location associated with the originating IP address;

comparing the determined first geographic location and the determined second geographic location; and providing an indication of likelihood that the mail message constitutes spam based on at least said comparing, wherein the indication indicates a higher likelihood that the mail message constitutes spam in response to the first and second geographic locations not matching than if the first and second geographic locations do match.

2. The method of claim 1, wherein the first geographic location associated with the originating domain name and the second geographic location associated with the originating IP address are deemed to match if they correspond to a single country.

3. The method of claim 1, wherein the first geographic location for the domain name is indicated using a domain name system defined for the Internet.

4. The method of claim 3, further comprising adding information associating various geographic locations with respective IP addresses to a database.

5. The method of claim 4, wherein the database further comprises IP addresses for trusted electronic message senders.

6. The method of claim 5, wherein providing the indication of likelihood that the electronic mail message constitutes spam further comprises querying the database to verify that the originating IP address corresponds to an IP address for a trusted electronic message sender.

7. The method of claim 5, further comprising associating certain IP addresses with an identifier signifying that the certain IP addresses correspond to trusted electronic message senders.

8. The method of claim 7, further comprising providing an interface configured to permit prospective message senders to apply for trusted electronic message sender status to be associated with an IP address.

9. The method of claim 8, further comprising requiring a delay between receipt of an application for trusted electronic message sender status and granting of trusted electronic message sender status.

10. A non-transitory memory holding instructions comprising:

instructions to access sender information for an electronic mail message, wherein the sender information comprises an originating domain name and an originating IP address for a server originating the electronic mail message;

instructions to determine a first geographic location associated with the originating domain name;

instructions to determine a second geographic location associated with the originating IP address;

instructions to compare the determined first geographic location and the determined second geographic location; and instructions to filter the electronic mail message in response to said comparing determining that the first geographic location does not match the second geographic location.

11. The non-transitory memory of claim 10, wherein the first geographic location is determined to match the second geographic location if both the first and second geographic locations correspond to a single country.

12. The non-transitory memory of claim 10, further holding instructions to determine the first geographic location by reference to a domain name system defined for the Internet.

13. The non-transitory memory of claim 10, further holding instructions to query at least one database to determine the first and second geographic locations.

14. The non-transitory memory of claim 10, further holding instructions to filter the electronic mail message if the first geographic location does not correspond to the second geographic location.

15. The non-transitory memory of claim 10, further holding instructions to query at least one database to verify that the purported originating IP address corresponds to an IP address for a trusted electronic message sender.

16. The non-transitory memory of claim 15 further holding instructions to filter the electronic mail message if the purported originating domain name does not correspond to the IP address for a trusted electronic message sender.

17. A computing device comprising:

a memory configured to store software instructions;

a processing unit configured to execute the software instructions to cause the computing device to:

determine a first geographic location associated with an originating domain name of an electronic mail message;

determine a second geographic location associated with the originating IP address of the electronic mail message;

compare the determined first geographic location and the determined second geographic location;

perform a first action on the electronic mail message in response to said comparing determining that the first geographic location does not substantially match the second geographic location; and perform a second action on the electronic mail message in response to said comparing determining that the first geographic location substantially matches the second geographic location.

18. The computing device of claim 17, wherein the first action comprises blocking, marking as spam, or further filtering the electronic mail message.

19. The computing device of claims 17, wherein the second action comprises allowing the electronic mail message to continue towards a destination indicated in the electronic mail message.

* * * * *

UNITED STATES PATENT AND TRADEMARK OFFICE

CERTIFICATE OF CORRECTION

PATENT NO. : 7,835,294 B2
APPLICATION NO. : 10/934604
DATED : November 16, 2010
INVENTOR(S) : Shuster et al.

It is certified that error appears in the above-identified patent and that said Letters Patent is hereby corrected as shown below:

Sheet 1, Figure 1, Line 2 (Box 102), delete "INFORMATON" and insert -- INFORMATION --.

Column 2, line 25, delete "66.28.153.1.to" and insert -- 66.28.153.1 to --.

Column 3, line 6, delete "of of" and insert -- of --.

Column 5, line 10, delete "66.28.153.1.to" and insert -- 66.28.153.1 to --.

Column 6, line 60, in Claim 16, delete "claim 15" and insert -- claim 15, --.

Column 8, line 8, in Claim 19, delete "claims 17," and insert -- claim 17, --.

Signed and Sealed this
Seventeenth Day of May, 2011

David J. Kappos
*Director of the United States Patent and Trademark Office*